MAGNETIC HEAD AND MOUNT THEREFOR

Filed Dec. 29, 1948 2 SHEETS—SHEET 1

INVENTORS
JAMES L. PETTUS
BY FRANK E. PONTIUS
Val R. Goslaw
ATTORNEY

Nov. 13, 1951 J. L. PETTUS ET AL 2,574,707

MAGNETIC HEAD AND MOUNT THEREFOR

Filed Dec. 29, 1948 2 SHEETS—SHEET 2

INVENTORS
JAMES L. PETTUS
BY FRANK E. PONTIUS
Orl R. Goshaw
ATTORNEY

Patented Nov. 13, 1951 2,574,707

UNITED STATES PATENT OFFICE 2,574,707

MAGNETIC HEAD AND MOUNT THEREFOR

James L. Pettus, North Hollywood, and Frank E. Pontius, Los Angeles, Calif., assignors to Radio Corporation of America, a corporation of Delaware Application December 29, 1948, Serial No. 67,892

5 Claims. (Cl. 179—100.2)

This invention relates to magnetic recording and particularly to the mounting structure of a magnetic head which can be used for recording, reproducing, or erasing.

It is well-known, in the art of magnetic recording, that the general type of magnetic heads for recording, reproducing, and erasing are of the same over-all structure which includes a core having one or more gaps therein over one of which the tape is passed, and windings on the core. The cores and windings are held together in some suitable manner, which provides a constant separation of the core ends by non-magnetic spacers. In mounting these heads, it is desirable that they be accurately adjustable with respect to the direction of motion of the magnetic film or tape passing over the gaps in order that the magnetic striations are perpendicular to the edge of the film or tape.

The present magnetic head construction provides for rapid and accurate orientation of a magnetic gap with respect to tape movement, the mount also providing a construction which simultaneously holds the cores in fixed, wedged position. The mount construction, therefore, readily permits the dismantling of the head when it is desirable to clean and repair or substitute a new head having different gaps. The entire mount is formed of only three castings, which serve not only for holding the cores and coils in position, but also for adjustably mounting the head, and which utilize a minimum of parts, such as screws, for assembling and disassembling both the head and the mounting therefor. It utilizes the ball and socket principle with means for providing positive rotation of the head holding member. The entire unit is compact, simple and economical to manufacture, and provides for a ready adjustment of the head.

The principal object of the invention, therefore, is to facilitate the mounting and adjustment of a magnetic head.

Another object of the invention is to provide an improved magnetic head clamp and adjustable mount therefor.

A further object of the invention is to provide a combination magnetic head structure and adjustable mount therefor.

A still further object of the invention is to provide a unitary magnetic head structure and mount having a minimum of parts.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 2:
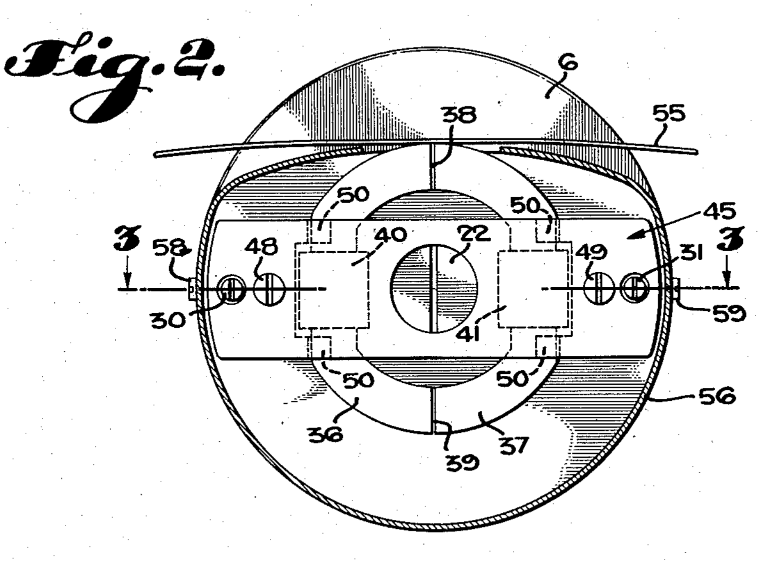
Fig. 2 is an elevational view of the structure taken along the line 2—2 of Fig. 1.
Figure 3:
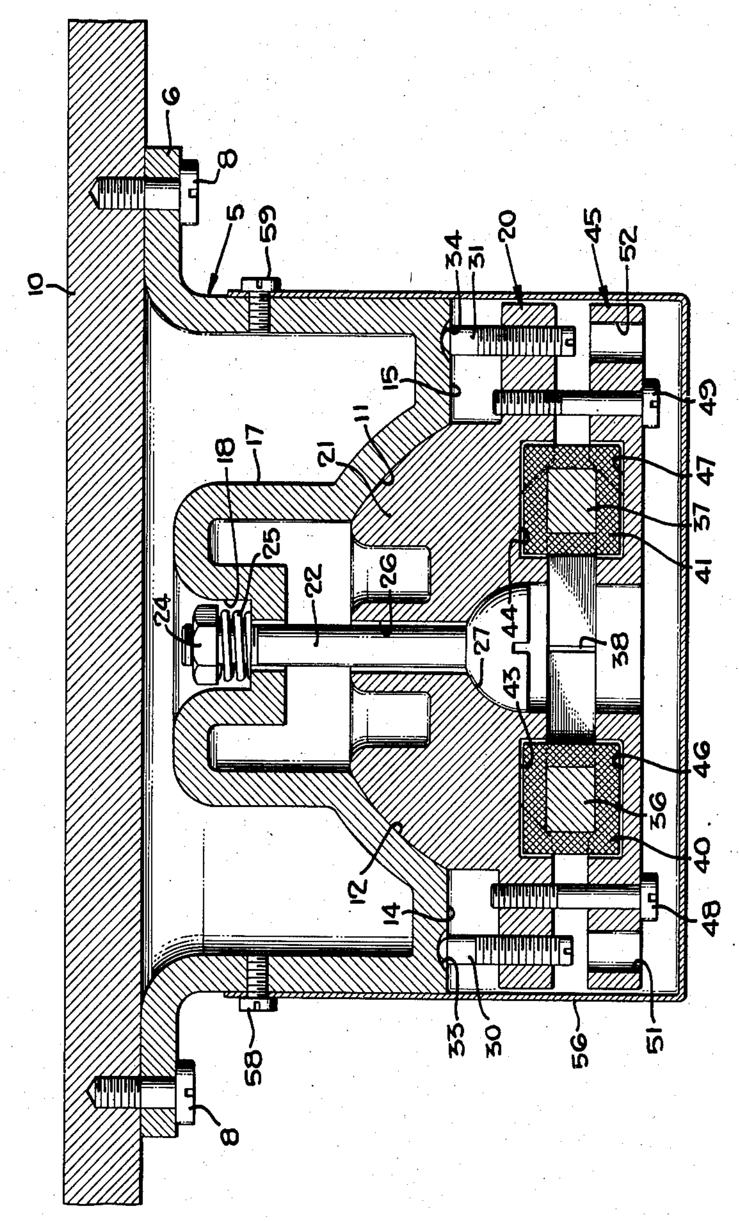
Fig. 3 is a cross-sectional view of the invention taken along the line 3—3 of Fig. 2.

Referring now to the drawings, in which the same numerals identify like elements, an annular base casting 5 has an annular flange 6, through a hole in which pass a plurality of screws, such as shown at 8, to hold the casting 5 to a supporting wall 10 or the like. This base casting may be die cast, and, as shown in Fig. 3, is cup-shaped to form either one or two curved bearing surfaces 11 and 12, which terminate in either one or a pair of flat platforms 14 and 15 and an annular boss 17 having a socket 18 therein. Although the casting 5 may be completely annular in all respects, or may be annular over the major portion thereof, in the present instance, the lower portion is rectangular, such as is illustrated in Fig. 2. The casting has openings therein to provide the desired wall thicknesses. Since the primary adjustment to be made in the head is held by the components of the invention, the socket may be rectangular so that the head is adjustable in one direction only.

Associated with the base 5 is a magnetic head holder element 20 having a body portion 21 with a surface or surfaces having the same curvature as the surfaces 11 and 12, the surfaces of the base and holder being held in contact by a screw rod or bolt 22 on one end of which is a nut 24, between which and the bottom of the socket 18, is a coil spring 25. The diameter of the bolt 22 is smaller than the opening 26 in the body 21, through which the bolt passes, the head thereof being spherically curved, such as is shown at 27, to contact a similarly curved surface on the head in the body 21. In this manner, the holder 20 may be rotated in the socket of the base 5. This rotation is accomplished by a pair of screws 30 and 31 which are threaded in the ears of the holder 20 and have their ends in detents 33 and 34, respectively, in platforms 14 and 15 of the base 5. Thus, by retracting one screw and advancing the other, rotation of the holder on an axis perpendicular to the plane of the paper of the holder 20 is facilitated.

Figure 4:
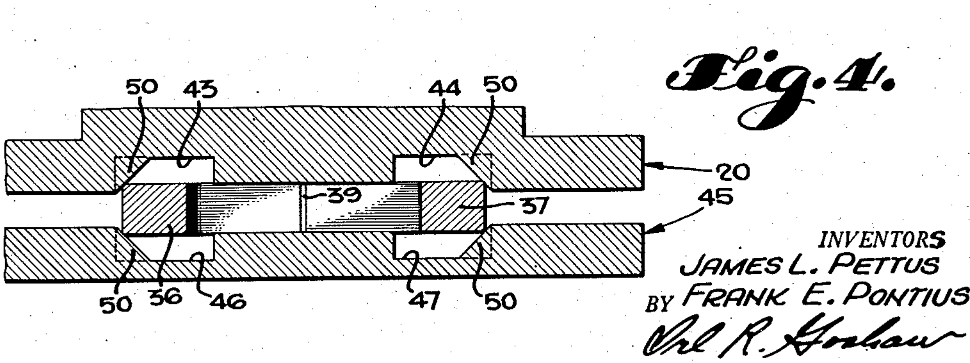
Fig. 4 is a detailed cross-sectional view showing the manner of obtaining clamping action on the core of the head.

Referring now to the magnetic head construction, which may either be a recording, reproducing, or erasing head, the head has core sections 36 and 37 with an operating gap 38, with the necessary spacer, and a rear gap 39, also having a spacer to provide the proper separation between the core ends. Surrounding the straight portions of the cores 36 and 37, are windings 40 and 41. To attach the head to the holder 20, it is fitted into a pair of recesses 43 and 44, and then a clamping plate 45, having recesses 46 and 47, is placed against the head, as shown in Fig. 2. Two screws 48 and 49 passing through holes in the clamp plate 45 and threaded into the ears of the holder 20 are then tightened. It will be noted, from Fig. 4, that the recesses 43, 44, 46, and 47 have respective tapered or slanted corner sections 50 on either side of the coils 40 and 41. Thus, by increasing the pressure on the head between the holder 20 and clamping plate 45, the cores are urged perpendicular to the axis of the screws 48 and 49, thus causing the pole pieces to be pushed together equally against the spacers in the gaps 38 and 39. The angle of these corner sections may vary to vary the amount of resultant right angle force. The head components are thus maintained in assembly, and the usual side plate fastening elements are not required, these latter having a tendency to loosen and permit the gaps to open up or widen beyond the desired dimension. Furthermore, any inaccuracy in parallelism of the core faces is corrected by pressure at the corners of the cores. It will be noted that the clamping plate 45 has holes 51 and 52 therein, so that the heads of adjusting screws 30 and 31 may be reached, to orient the gap 38 after it is once assembled in the holder 20.

Figure 1:
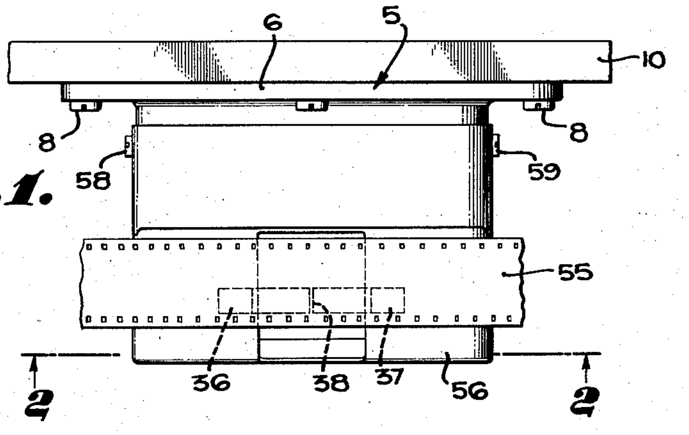
Fig. 1 is a plan view of the invention, showing a magnetic record medium passing thereover.

In Figs. 1 and 2, a section of magnetic tape or film 55 is shown passing the gap 38 of the head, these figures, together with Fig. 3, also showing a magnetic shield 56 surrounding the head and held to the base 5 with screws such as shown at 58 and 59. As mentioned above, the shape of the base 5 and holder 20 may be more or less annular, and, in this event, three screws could be provided to rotate the gap in any direction. However, the critical adjustment of the gap of a magnetic head is with respect to the direction of film motion, it being desirable to have the long dimension of the gap perpendicular thereto, and such an adjustment has been provided which may be very easily made. The three main sections of the mount, such as the base 5, holder 20, and clamping plate 45, may be die castings which simplify and make the manufacture of the unit economical. The rotational adjustment is in its simplest form, while the entire unit is compact and has a minimum of components.

We claim:

1. A magnetic head mounting structure, comprising a base having a spherical socket therein, magnetic head holding members, one of said holding members having a surface in contact with said socket surface and slidable in said socket, the other of said holding members being a clamping plate, a single resiliently mounted element passing through the center of said socket and one of said holding members to adjustably fasten said base to said holding members, and a plurality of screws spaced from said single element and passing through one of said holding members and contacting said base to orient and lock said member in position with respect to said base.

2. A magnetic head structure and mounting, comprising a core having at least one gap therein, windings on said core, a holder having separate portions with opposing recesses therein to accommodate a portion of said core, said recesses having tapered sides bearing against said core, pressure on said core by said portion exerting pressure on said core perpendicular to said gap, one portion of said holder having an externally curved surface and a base having a similarly curved surface adapted to contact said curved surface on said holder portion.

3. A magnetic head structure in accordance with claim 2, in which a resiliently mounted rod passes through substantially the center of said holder portion having said curved surface and said base to maintain said surfaces in contact, threaded means being positioned at the sides of said rod for sliding said surfaces relative to one another.

4. A head mount comprising a socket member with at least one substantially spherical surface extending substantially across the entire width of said member, a head holder having a portion with a surface portion of the same shape and width as said socket surface and in contact therewith, means for holding said holder portion and said socket member in contact and permitting sliding adjustment therebetween along the contacting surfaces thereof, a head, a second portion for said head holder, and means for holding said head between said portions of said holder.

5. A head mount in accordance with claim 4, in which said holder portions have opposing recesses therein to accommodate said head, and means in said recesses having opposing, sloping sides in contact with said head to apply pressure to said head perpendicularly to the axis of said head.

JAMES L. PETTUS.
FRANK E. PONTIUS.

REFERENCES CITED

The following references are of record in the file of this patent:

UNITED STATES PATENTS

| Number | Name | Date |
|---|---|---|
| 786,093 | Bostrom | Mar. 25, 1905 |
| 1,961,036 | Boyle | May 29, 1934 |
| 2,136,035 | Altemus | Nov. 8, 1938 |
| 2,439,194 | Wild | Apr. 6, 1948 |

FOREIGN PATENTS

| Number | Country | Date |
|---|---|---|
| 676,810 | Germany | June 12, 1939 |